United States Patent [19]

Thacker et al.

[11] 4,219,905

[45] Sep. 2, 1980

[54] ANIMAL STUNNING GUN

[76] Inventors: Fred E. Thacker, 91113 Sunderman Rd.; Verdell Noteboom, 91161 Sunderman Rd., both of Springfield, Oreg. 97477

[21] Appl. No.: 900,423

[22] Filed: Apr. 27, 1978

[51] Int. Cl.² .............................................. A22C 11/00
[52] U.S. Cl. ........................................................ 17/1 B
[58] Field of Search ........................................... 17/1 B

[56] References Cited

U.S. PATENT DOCUMENTS

| 801,839 | 10/1905 | Behr | 17/1 B |
|---|---|---|---|
| 910,775 | 1/1909 | Bergh | 17/1 B |
| 3,798,707 | 3/1974 | Willems et al. | 17/1 B |

FOREIGN PATENT DOCUMENTS

| 148526 | 11/1901 | Fed. Rep. of Germany | 17/1 B |
|---|---|---|---|
| 5124 | of 1902 | United Kingdom | 17/1 B |

Primary Examiner—Willie G. Abercrombie

[57] ABSTRACT

Disclosed is a stunning gun for meat animals including beef, buffalo, horses, veal, and the like comprises: a hand held pneumatic housing having a pistol grip and an actuating trigger; a forward animal contacting safety and release, arming portion; valve mechanism operated by the trigger's actuation; and a pneumatic airline supplying air under pressure to an extensible and retractable piston and needle assembly. Upon the admission of air under pressure behind the piston, a needle attached thereto is caused to move from its starting retracted rest position through an opening in the front or muzzle of the gun to penetrate an animal's skull, depositing a charge of air into the animal's skull, stunning it for slaughter. Air passages are arranged in connection with valves in the housing to cause the needle and piston to retract automatically to the starting position after the stunning operation is completed.

3 Claims, 13 Drawing Figures

ANIMAL STUNNING GUN

BACKGROUND OF THE INVENTION

1. Field of the Invention
   Meat Animal Stunning Tools
2. Prior Art

The meat packing industry has long sought a quick, efficient humane and inexpensive means to stun animals for slaughter. With smaller animals electrical shock devices, hammers, sledges, and the like are often sufficient to stun the animals for slaughter. With larger animals, such as beef and horses, heavier blows to the skull are required. Various explosive charge devices has been employed with some satisfactory results, but they are expensive to operate, maintain and clean, require reloading with expensive percussion cartridges usually after each stunning operation, and deposit hair, bone and filth in the skull of the animal, rendering the brain unfit for human consumption. All such devices require that a part of the skull be driven into the brain in front of a captive bolt (usually concave) dislodging a sufficient amount of skull material, which is deposited in the brain, to cause the animal to be rendered unconcious.

The problems associated with prior art devices have led to a search for a device which is less expensive to maintain and operate. As well, there was a need for an easily adjustable device, capable of varying the stunning force in dependence on the size of the animal involved.

SUMMARY OF THE INVENTION

The device of this invention solves the problem found in prior art. It is useful for all larger sizes of meat animals. Rather than use an explosive charge, it employs a penetrating needle, which, through a compressed air connection, deposits a controlled charge of air into the skull of the animal, stunning it quickly, efficiently, cleanly and humanely. Since the skull of such an animal is a closed chamber, except for the point of connection to the spinal cord, the sudden build of air immediately stuns the animal. It may also sever the spinal cord. By controlling the charge of air, utilizing variable air pressure and controlled sized port openings, the complete stunning of various size animals is assured. Also the device of this invention insures better bleeding of the stunned animal thereby improving the quality of the meat, and organs, including the brain, obtained therefrom. While it is preferable to use the device of this invention for large animals such as beef, cattle and horses, its range of use extends throughout all of the range of meat animals because it has adjustable, controllable features making it suitable for use in stunning all meat animals.

The basic tool of this invention is a hand held pistol shaped device. A source of compressed air connects to the device at an appropriate place, for example, to the base of the grip portion. The "muzzle" end houses or carries safety elements which when pressed against the skull of the animal, allows compression of the pilot valve through a linkage with the trigger which controls the air input. Compressed air when released by the trigger operating through a linkage causes the piston to advance, and hence a penetrating needle attached thereto. A hollow passageway extends from the rear of the penetrating needle to a nose portion and includes a passageway, through which the air may pass once the needle has penetrated into the skull of the animal in order to deposit a controlled charge of compressed air into the skull of the animal, stunning it so that slaughtering can proceed efficiently.

A plurality of valves are involved which are actuated by a linkage associated with the trigger and the contact safety elements to admit the charge of air to a valve which operates to cause the piston, and its connected penetrating needle, to move from its retracted position to a forward position into the skull of the animal. At the same time, other valves within the body of the housing carrying the elements of the device of this invention, operate to cause the piston and needle to retract automatically once the charge of air has been deposited in the skull of the animal. As an additional safety feature, the pressure contact, safety, and arming elements associated with the muzzle end of the device of this invention cock, in one embodiment, and remain in the operative position throughout the cycle and including the retracting cycle. This means that upon readying the tool for subsequent use, an additional safety feature is involved which requires that the forward elements be hand cocked in order to arm the device for the next stunning operation.

In an alternate embodiment a different valve is utilized, which eliminates one possible problem of having the penetrating needle hang up during the retraction step by providing a different valve which does not close until the needle is fully retracted.

Other objects and features of this invention will be understood from the description which follows below in connection with the accompanying drawing.

DESCRIPTION OF THE PREFERRED EMBODIMENTS

Figure 1:
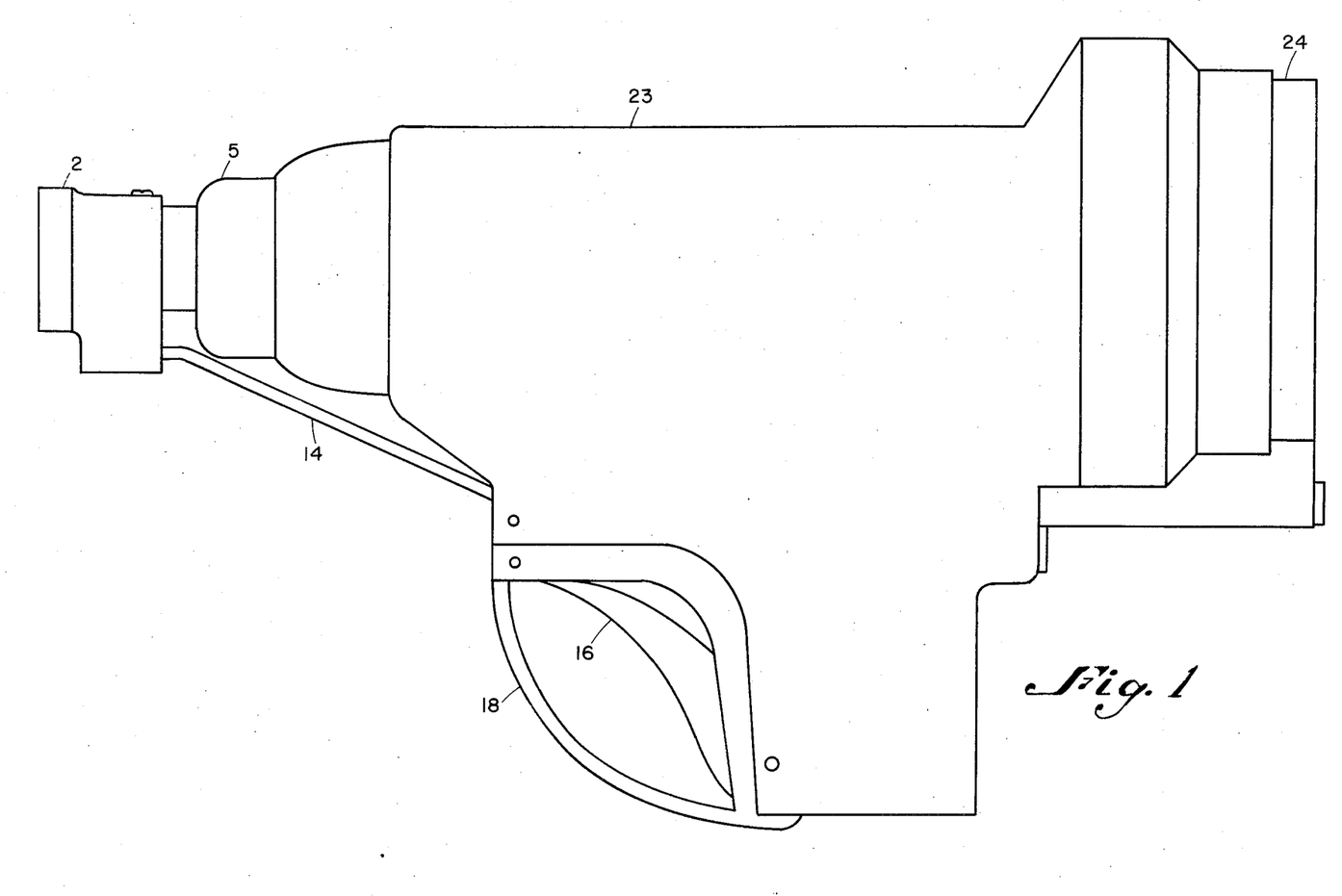
FIG. 1 is a side view of the device of this invention.
Figure 1A:
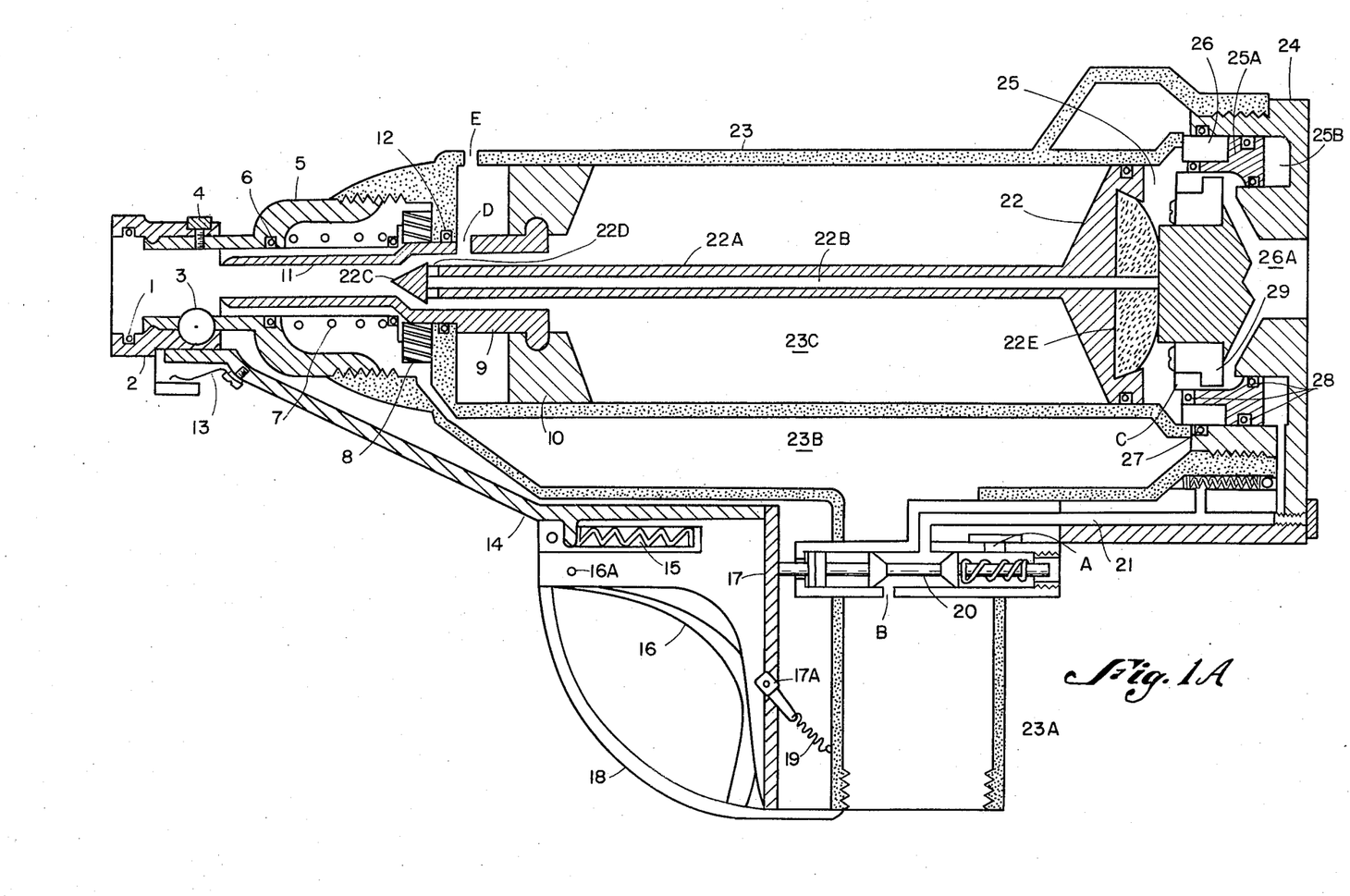
FIG. 1A is a cross sectional view of the device of this invention, illustrating the starting position of the various elements in a preferred embodiment.
Figure 1B:
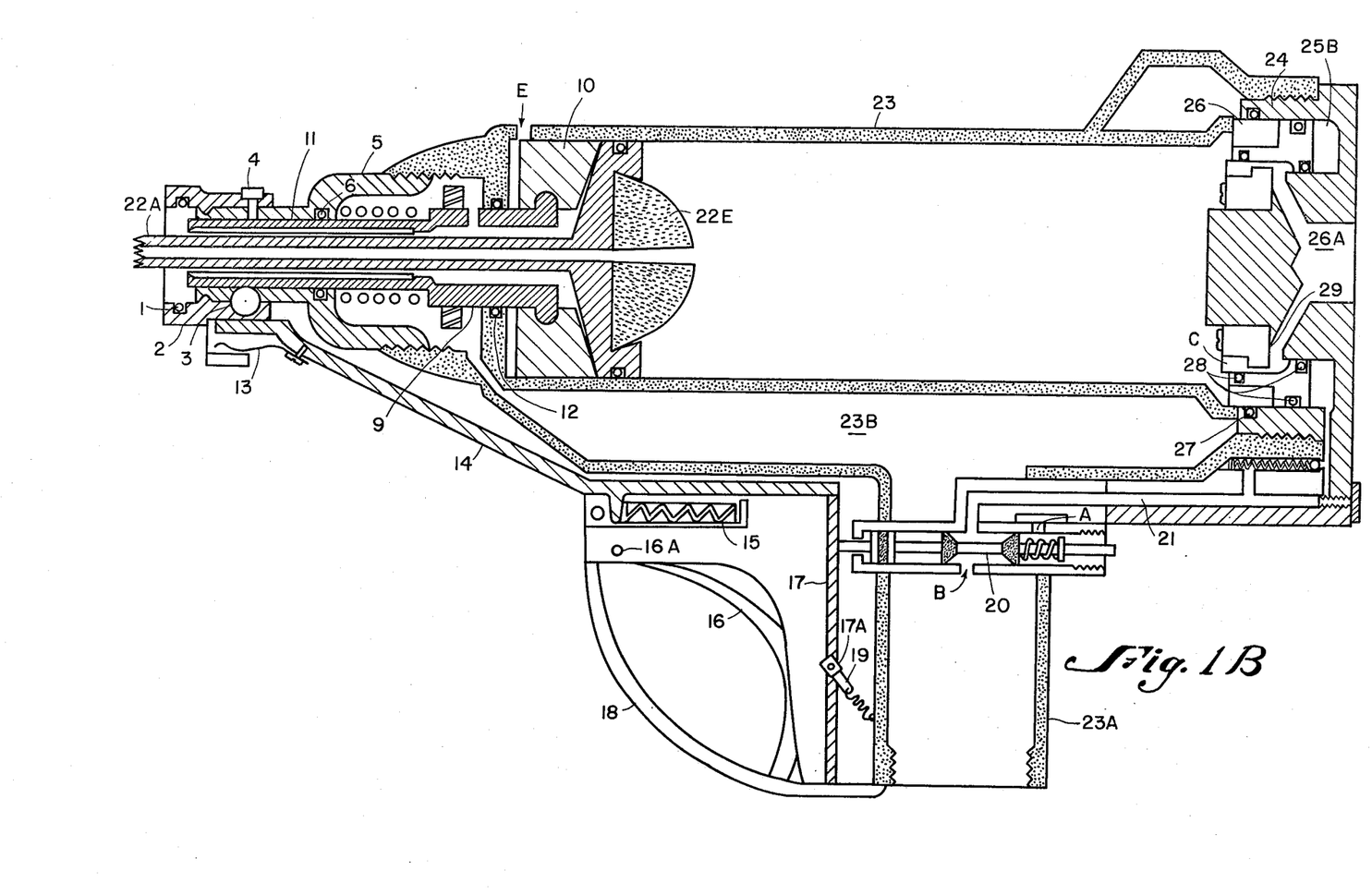
FIG. 1B is a view similar to FIG. 1A illustrating the extended position of the elements.

Referring now to FIGS. 1, 1A, and 1B, the preferred form of the device of this invention is illustrated in a manner which should permit ready understanding of the principle elements and their functioning in operation.

Starting at the front or muzzle end, it will be noted that there is an O ring latch spring 1 associated with an actionator head 2 located at what corresponds to the "muzzle" end of the pistol shaped device indicated generally in FIG. 1. A rotatably mounted steel ball 3 is positioned as illustrated and its operation and functioning will be described below. A retainer screw 4 interconnects the actionator head 2 and a retract valve housing 5 as illustrated. A O ring seal 6 positioned in the retract valve housing 5 seals the retract valve housing 5 with respect to a teflon lined steel tube portion 11 of the retract valve core body 9. A spring element 7 is positioned between the retract valve housing 5 and the retract valve seal 8, preferably made of teflon, which abuts the valve core body 9. A valve bumper 10 made of high impact plastic is interconnected to the valve core body 9. As illustrated the valve bumper 10 is positioned within a cylindrical housing 23 which constitutes the case or body 23 for the device of this invention.

There is another O ring seal 12, positioned as illustrated in FIG. 1A, which serves to seal the valve core body 9 when it advances toward the muzzle end of the device illustrated in FIG. 1. A leaf spring 13 attached to an actionator link bar 14 bears on the inner side of the actionator head 2 causing muzzle end of the bar 14 to bear on the steel ball 3 and hold it in place.

There is an actionator bar return spring 15 positioned above the trigger 16 in the pistol grip portion 23A of the stunner case 23.

The trigger 16 is carried within a trigger guard 18 and is pivotable about pin 16A. Actuation of the trigger 16 operates a coupling bar 17 pivotally attached to member 17A which is held into position illustrated in normal unactuated operation by means of trigger return spring 19. Immediately behind, looking to the right as illustrated in FIG. 1A of the coupling bar 17, there is a pilot control valve 20. Air under pressure, supplied by a conventional air compressor at from 80 psi to 160 psi, for example, through a connection to the pistol grip portion 23A, is present in the lower chamber area 23B and in drive valve chamber 25B. The pilot valve 20 has an intake port B which, when open as shown admits the air under pressure through tube 21 to the rear side of main drive valve 24.

Figure 3:
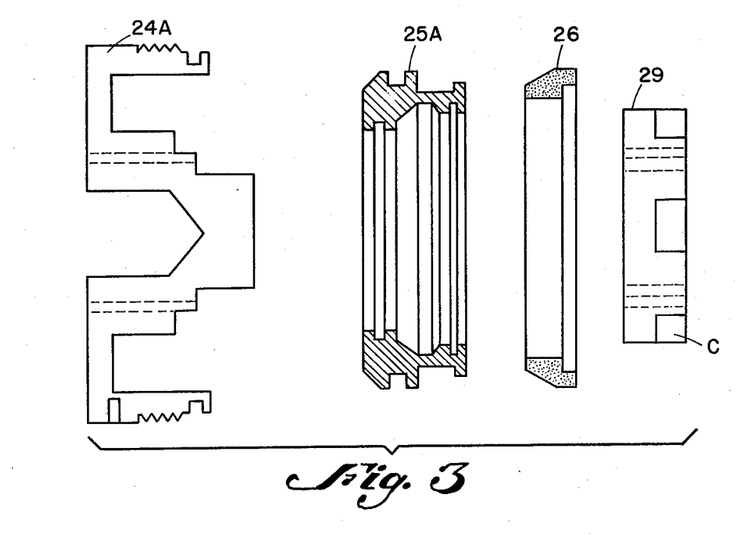
FIG. 3 is a assembly drawing illustrating the parts which make up the main valve which operates to admit high pressure air behind the piston-needle assembly.
Figure 4:
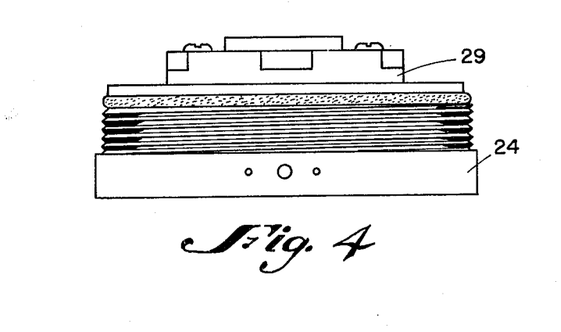
FIG. 4 is a side view of the assembled mainvalve.

Also housed within the stunner case 23 is a drive valve 24 as is more fully illustrated in FIGS. 3 and 4. The drive valve 24 comprised of a valve ring 25A, positioned as illustrated, which, along with a cylinder seal 26, in conjunction with O rings 27, 28, serve to assist in the sealing of the various parts which move relative to the fixed stunner case 23 and the drive valve 24. A ported ring guide 29 is incorporated and will be described in detail in connection with the operation of the device as set forth below.

In addition to the other ports previously described there is exhaust port A for the pilot valve 20, five valve exhaust ports C, a retract valve exhaust vent D, and exhaust vents E in the stunner case 23. Retract vent 26A in the rear of drive valve 24 releases the air under pressure behind piston-needle assembly 22 to atmosphere.

Figure 2:
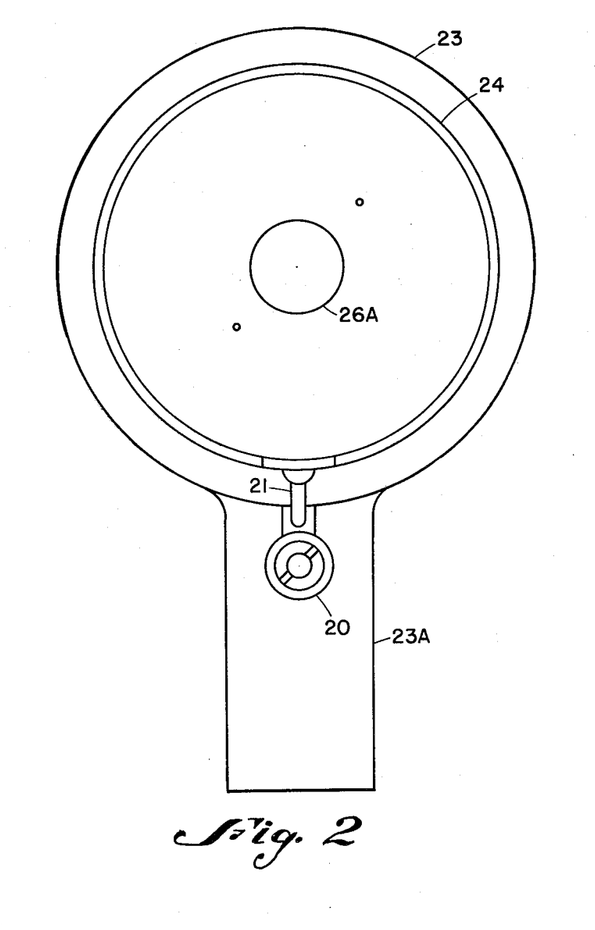
FIG. 2 is a rear elevation of the device of this invention.
Figure 5:
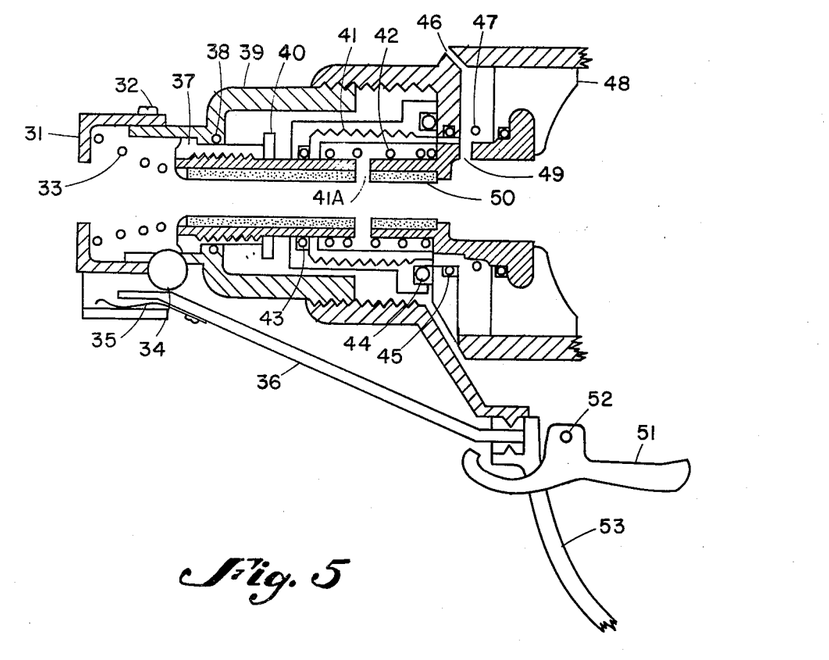
FIG. 5 is a partial cross section of the front portion of an alternate form of the device of this invention.

FIG. 2 is a rear view showing the pistol grip portion 23A, the rear end of the stunning casing 23, along with the associated drive valve case 24. In FIG. 3, the various elements making up the drive valve 24 are illustrated in a plurality of drawings showing how the various parts fit together, and the details thereof in general including a housing 24A, valve ring 25A, cylinder seal 26 and ported ring guide 29. This valve 24 is adapted from a device utilized for pneumatic driving of nails, and other than a few modifications the basic operation of the various components is well understood in the art. However, it will be appreciated that their utilization in a complete assembly as illustrated in FIG. 1 or in the alternate embodiment as illustrated in FIG. 5 is the subject matter of this invention and constitutes a use never contemplated for a valve of this type. The drive valve case 24A, through matching threads in the stunner case 23, is mounted in the rear end thereof. The manner in which the device operates to provide the controlled flow of air under pressure to operate the drive valve 24 hence to the rear of the piston, hollow needle assembly 22 will now be described.

Illustrated in FIG. 1A, i.e. the fully retracted position, the parts are in the positions as illustrated. In FIG. 1A, when the actionator head 2 has been depressed, moving the actionator bar 14 rearwardly, and the trigger 16 has been depressed moving the coupling bar 17 into position, so that the pilot valve 20 operates to close air under pressure off which holds drive valve 24 closed. This is the start of the operation of the device. When port B of pilot valve 20 is closed, elongated port A is partially opened allowing the air under pressure holding drive valve 24 closed to escape to atmosphere through the rear of pilot valve 20. The release of pressure from behind drive valve ring 25A unseats seal ring 26 as it moves to the right as shown in FIG. 1A. Since chamber 23C is at atmospheric pressure, the rearward movement of the drive valve 24 elements admits the air under pressure to the rear of the piston-needle assembly 22 driving it forward.

The acceleration of the piston-needle assembly 22 from at rest to a high speed, with its attendant mass, causes the tip 22C of the needle portion 22A to penetrate through the skull of the animal. When needle 22A enters the teflon liner portion 11 of retract valve core body 9 the entrapped air in chamber 23C in front of piston-needle 22 is bled out through vents D and E to atmosphere. A portion of the high pressure air, present in the hollow portion 22B of needle 22A, exits through orifice 22D in the tip portion 22C and enters the animals skull, instantaneously stunning the animal.

In FIG. 1B the parts are in the position which they would be in at the fully extended portion in which the penetrating needle 22A is fully extended and air is admitted through the hollow tube 22B into the skull of an animal being stunned by the device of this invention. At this point the automatic retract sequence operates. FIG. 1B illustrates the position of the parts at the initiation of the retract cycle.

SEQUENCE OF OPERATION

The actionator head 2 is placed on the animal, forcing it back which, through the linkages described above moves the pilot valve 20 into the firing position. Port B is crossed opening port A allowing air to escape from behind valve ring 25A through tube 21. When the trigger bar 16 is pulled back it forces coupling bar 17 up into the path of the actionator bar 14. As the valve ring 25A is forced back, ports C are closed on ported ring guide 29. Cylinder seal 26 is then pulled open allowing the air to enter a chamber 25 behind the piston 22 thus forcing the piston forward. Vents D and E as illustrated in FIG. 1 permit air in front of the piston 22 to escape. The needle 22A penetrates the target, i.e. up to 2½ inches, an adjustable amount, forcing air into the target through the hollow opening in needle and out through the opening in the muzzle ajacent end of the needle portion assembly 22A.

As the piston 22 contacts the valve bumper 10 vents D and E are closed. As the retract valve is opened the valve core body 9 forces the ball 3 outwardly releasing the actionator bar 14 from the catch in the actionator head 2. The ring latch 1 holds the head 2 in place, a spring 15 forces the actionator bar 14 forward releasing valve 20 and closing exhaust port A while at the same time opening port B allowing the drive valve 24 to close. Air is exhausted through port C to atmosphere. The retract valve 9 closes as the piston 22 is forced to stop in the position as illustrated in FIG. 1B thus stopping the air flow. The rubber bumper 22E serves to cushion the piston-needle's return and quiet the operation. Actionator 2 must be manually pulled forward prior to the next operating sequence.

Referring now to the device illustrated in FIG. 5 a modification of the device has been made which may avoid a problem which was encountered in some instances in connection with the device illustrated in FIG. 1 through FIG. 1B.

The specific problem addressed was that of the device hanging up during the retraction phase. That problem has been avoided by the valve having been incorporated in the muzzle portion of the device associated with the retraction mechanisim and porting so that the retract valve does not close until the needle is fully retracted. In the device as illustrated in FIGS. 1A and B there was a possibility of hanging up since the retraction phase and its associated valves might have a tendency to close prematurely, whereas the device as illustrated in FIG. 5 insures that the retract cycle operation will continue until the needle and piston assembly 22 has been forced back into its fully retracted position i.e. in the position illustrated in FIG. 1.

In the device illustrated in FIG. 5 an actionator head 31 is attached by means of a screw 32 to a retract valve housing 39. A body retainer member 37 sealed by means of an O ring seal 38 is connected to valve body 49. Bumpers 40 are positioned so that as the valve body 41 moves, sealed by O ring seal 43 assisted by return spring 42, vents openings 46 vent the return valve mechanisim 44 to atmosphere. There are bumpers 48. The retract valve housing 49 has an associated wear liner 50. Additional sealing members 45 assist in the operation of the device. As before there is a steel ball 34 and its retaining spring 35 associated with the actionator bar 36. Also there is a trigger 51 pivotally attached at 52 to a housing (not shown) which replaces the head 2 and its catch ring 1. A trigger guard 53 is also included for safety purposes.

In both of the forms of the device illustrated in FIGS. 1A and B and FIG. 5 it will be seen that the functioning of the retract mechanisim is substantially the same in both instances. The retract mechanisim is controlled by the retract valve and does not come into play until the end of the forward motion of the needle and piston which opens the ports permitting air under high pressure to enter the area immediately in advance of the piston. At this point in time the piston-needle assembly 12 is driven to the right as illustrated in the Figures so that it is forced to the right to return to the position illustrated in FIG. 1A.

Figure 6:
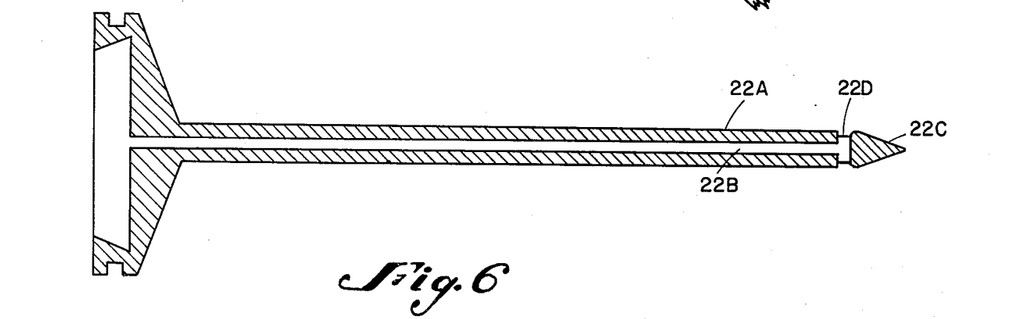
FIG. 6 is a cross-sectional side view of the piston and needle assembly.
Figure 7:
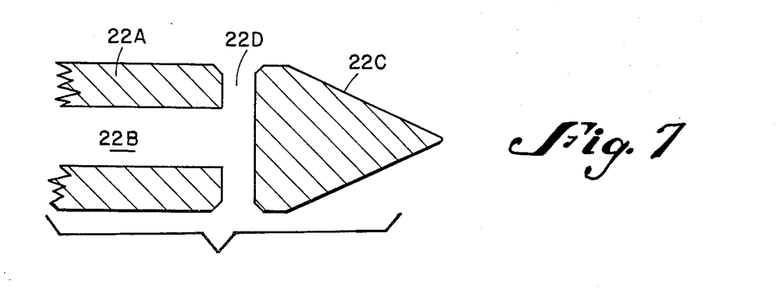
FIG. 7 is a partial cross-sectional side view of the penetrating end of the needle element.

Referring now to FIG. 6 the details of the piston-needle assembly 22 are illustrated. The piston itself is designed in such a manner that the needle may be a part of or may be a seperate device attached firmly to the piston. As illustrated in FIG. 6 the bumper member 22E is not present, how ever the piston itself with its attached needle 22A is present. It will be noted that there is a hollow opening 22B extending throughout the length of the piston-needle assembly 22 so that a portion of the air under pressure behind the piston from the chamber 25 is passed through the hollow needle portion 22B and accordingly is passed out through the openings 22D formed in the outerend so that, upon penetration of the point 22C, a controlled amount of air enters in the skull of the animal being stunned. As illustrated in FIG. 7 there the needle point 22C is chamfered in such a manner that nothing can hang up in the openings or ports 22D, thus, in effect the instrument is selfcleaning.

Figure 8:
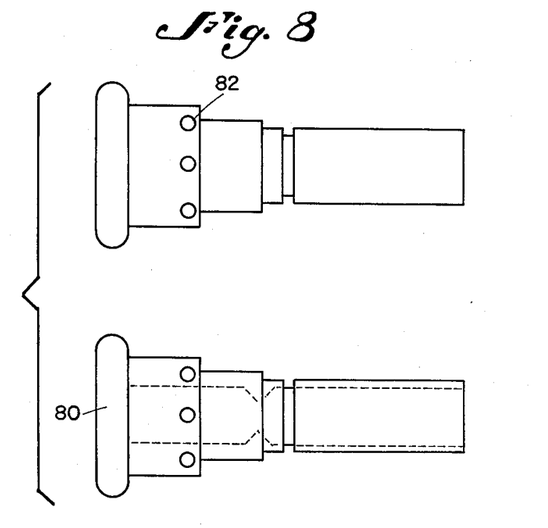
FIG. 8 is a side elevation of one form of the retract valve element.
Figure 9:
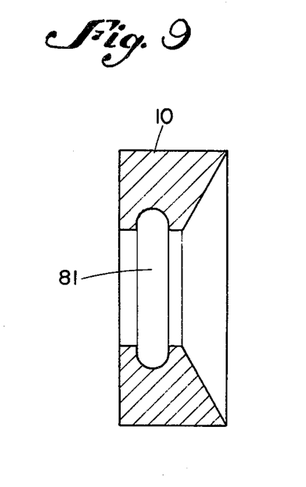
FIG. 9 is a cross-sectional view of the forward cushion element which serves to stop the piston-needle assembly's outer movement.

Illustrated in FIG. 8 is one form of the retract valve which shows the portion 80 which fits into a recess 81 in the bumper element 10 illustrated in FIG. 9. Ports 82 are drilled through the device as illustrated in FIG. 8 and are in communication with the opening through which the needle portion 22A passes. A teflon liner 11 is positioned within the bore of the device illustrated in FIG. 8 so as to guide and to seal the passage of the needle there through.

It will be appreciated that other elements such as retaining rings and support rings and the like may be required in order to physically position the device as illustrated in FIGS. 8&9 within the related portion of housing 23.

Figure 10:
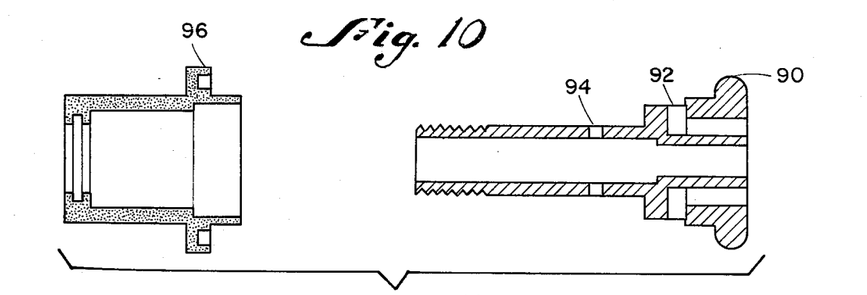
FIG. 10 and 10a constitute an exploded assembly drawing illustrating the parts of an alternate form of retract valve elements.
Figure 10A:
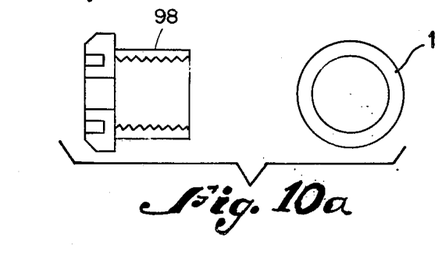

The device illustrated in FIG. 10 are the elements of the alternate form of retract valve illustrated in FIG. 5 in which a device 90 has outer shoulders which mate into a bumper ring 10 and have ports 92, 94, which are arranged in such a manner as to provide the opening of air passages therethrough in order to cause the operation of the retract valve, cup element 96 and a retaining element 98 are formed in such a manner so that, when inter-connected, the retract valve member illustrated in FIG. 5 can fulfill the purposes described therefor above.

Figure 11:
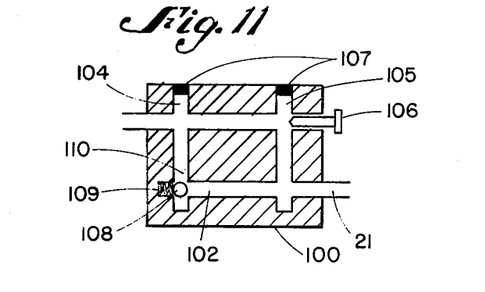
FIG. 11 is a cross-sectional drawing of an adjustable control valve for adjusting the dwell time of the needle's penetration before the retract cycle starts.

A member 100 (got example, a block) having longitudinal drilled passages 102 and 103; and tranverse drilled passages 104 and 105 (sealed at 107) includes a thumb screw needle valve 106 threaded in one end of passage 103. The other end of passage 103 connects to main valve element 23A. Passage 102 is closed at one end and contains a ball valve element 108 and its return spring 109 which cooperate with valve seat 110 to block air passage from the main valve element 23A to the pilot valve 20, thus requiring the air to flow through passage 103 to passage 105 past adjustable needle valve 106. Thus the time the needle 22 remains in its extended position is adjustable by controlling the rate of flow from main valve element 23A, during the retract cycle, to the pilot valve 20 (and thence to atmosphere). During firing the air from pilot valve 20 may pass through passage 102, flow freely through valve seat 110, when flowing in that direction, to passages 104, 103 and thence to main valve element 23A.

It will be appreciated that specific forms of the device illustrated are sufficient to accomplish the results desired of solving the problem as set forth above which has been long existing the prior art. It will be understood however by men of ordinary skill in the art that modifications may be made in the specific form of apparatus disclosed which do not depart from the scope of the appended claims.

What it is claimed is:

1. A stunning device for use on meat animals comprising:
   a hollow pistol shaped housing having means for connecting a source of air under pressure thereto;
   an elongated piston-needle assembly having a restricted opening formed axially therethrough positioned within said housing for reciprocal motion in guiding means formed in the interior of said housing, said assembly having a retracted and an extended position;
   pneumatic drive, retract and pilot valve means carried by said housing;
   manually operable trigger means mechanically connected to operate said pilot valve means;
   manually operable actionator head means having a mechanical linkage means arranged to prevent the operation of said trigger means until manually reset after each operation of said device;
   said pilot valve means arranged to admit air under pressure to the interior of said housing to maintain said assembly in its retracted position for so long as said trigger means is not operated whereby, when operated by said trigger means, said pilot valve means causes said drive valve to admit air under pressure to the rear of said assembly to propel said assembly from its retracted position to its extended position and to allow a controlled adjustable portion of said air under pressure to flow through said axial opening to clear a path for the tip end of said assembly and, when said needle has penetrated the skull of an animal, to deposit a controlled, adjustable amount of air into the skull cavity of said animal sufficient to stun said animal without interfering with proper bleeding of said animal and without said assembly carrying hair or other foreign matter into the skull of the animal;
   said assembly being arranged to operate, in its extended position,
   said retract valve means admitting air under pressure to the forward end of said assembly propelling it to its retracted position and said assembly also mechanically operating said actionator head means to interrupt the linkage between said head means and said trigger means; and adjustable retract cycle control means arranged to prevent said retract valve means operation for a controlled period of time and to continue said retract valve means operation until said assembly has reached its fully retracted position.

2. The stunning device of claim 1 wherein said adjustable retract cycle control means pneumatically interconnects said source of air under pressure to said retract valve means by means of passageways, at least one of which includes an adjustable element whereby adjusting the position of said element controls the delay in initiation of said retract cycle, thus controlling the time said assembly remains in its extended position.

3. The stunning device of claims 1 or 2 wherein said assembly's tip portion has chamfered openings whereby any foreign matter is cleared therefrom by the passage of air under pressure therethrough to make said device substantially self-cleaning.

* * * * *